United States Patent
Barsukov et al.

(10) Patent No.: US 6,756,027 B2
(45) Date of Patent: Jun. 29, 2004

(54) METHOD OF PREPARING GRAPHITE INTERCALATION COMPOUNDS AND RESULTANT PRODUCTS

(75) Inventors: Igor V. Barsukov, Glenview, IL (US); Peter L. Zaleski, Willowsprings, IL (US)

(73) Assignee: Superior Graphite Co., Chicago, IL (US)

( * ) Notice: Subject to any disclaimer, the term of this patent is extended or adjusted under 35 U.S.C. 154(b) by 121 days.

(21) Appl. No.: 09/865,207

(22) Filed: May 24, 2001

(65) Prior Publication Data

US 2002/0008031 A1 Jan. 24, 2002

Related U.S. Application Data

(60) Provisional application No. 60/206,731, filed on May 24, 2000.

(51) Int. Cl.$^7$ ............................................ C01B 31/04
(52) U.S. Cl. ........................................ 423/448; 205/768
(58) Field of Search ................... 205/555, 768; 204/157.47; 423/448

(56) References Cited

U.S. PATENT DOCUMENTS

| | | | |
|---|---|---|---|
| 3,472,753 A | | 10/1969 | Wojtanek |
| 3,498,902 A | | 3/1970 | Wojtanke |
| 4,091,083 A | | 5/1978 | Hirschvogel et al. |
| 4,350,576 A | | 9/1982 | Wantanabe et al. |
| 4,555,393 A | * | 11/1985 | Sorensen et al. ............ 423/448 |
| 4,895,713 A | | 1/1990 | Greinke et al. |
| 5,032,240 A | * | 7/1991 | Argade ...................... 204/132 |
| 6,319,391 B1 | * | 11/2001 | Holderness et al. ........ 205/768 |

FOREIGN PATENT DOCUMENTS

WO     WO 99/46437     9/1999

* cited by examiner

Primary Examiner—Stuart Hendrickson
(74) Attorney, Agent, or Firm—Cook, Alex, McFarron, Manzo, Cummings & Mehler, Ltd.

(57) ABSTRACT

A method of preparing graphite intercalation compounds in which graphite particles are immersed in an aqueous electrolyte media comprising both an acid and an oxidizing agent. The immersed graphite particles are subjected to an anodic current and then removed from the electrolyte and rinsed with a solvent. The excess solvent and electrolyte is then removed from the graphite particles. The graphite particles may be placed in a plating barrel which is immersed in the electrolyte and rotated while the graphite particles are subjected to the current. The resultant intercalated graphite has an expansion volume of from between about 100 ml/g to 2000 ml/g when heated to 1000° C.

16 Claims, 3 Drawing Sheets

METHOD OF PREPARING GRAPHITE INTERCALATION COMPOUNDS AND RESULTANT PRODUCTS

CROSS-REFERENCE TO RELATED APPLICATION

This application claims the benefit of provisional application Ser. No. 60/206,731, filed May 24, 2000.

BACKGROUND OF THE INVENTION

The present invention relates to a method of preparing graphite intercalation compounds and the resultant products.

Highly lamellar forms of graphite have found wide ranging industrial applicability because of their low thermal and electrical resistivity and their ability to enhance thermal and electrical conductivity when added to a low or non-conductive particulate material. Such graphite has particular utility in making seals and gaskets for high temperature applications. Further, when highly lamellar graphite is mixed with or dispersed in particulate which are non-conductive or partially electrically conductive, the thin platelets of graphite become interlaced between the base particles, thus providing a more conductive path and more uniform contact with the particles than could achieved using the same concentration of non-lamellar graphite.

Exfoliated or expanded lamellar graphite has similar enhanced characteristics and utility. Thermally exfoliated graphite ("TEG") has an accordion-like configuration of separated, stacked lamellae. Like naturally occurring lamellar graphite, delaminated, exfoliated, expanded graphite "worms" are also used for applications such as enhancing thermal or electrical conductivity in various matrices. For example, in the manufacture of alkaline electrolyte batteries, delaminated exfoliated flake graphite is used in the positive electrode active material. See, e.g., U.S. Pat. No. 5,482,798 to Mototani et al., which is incorporated herein by reference. If the flake graphite can be expanded in a manner to maximize its surface area for a given mass and be successfully delaminated, greater conductivity can be attained for the positive electrode. This results in an improved discharge performance, higher rate capabilities, and longer useful life for the battery. Simultaneously, the amount of graphite needed to produce the electrode can be decreased, permitting an increase in the amount of the active electrode material, $MnO_2$.

Typically, lamellar graphite has been expanded by the intercalation of a compound into or between the interlayers of the crystal structure of the graphite. The graphite intercalation compound ("GIC") is then expanded to dramatically enlarge the spaces between the graphite interlayers. The intercalation of lamellar graphite has been studied in detail and described in numerous technical papers and patents. For example, Hirschvogel et al. U.S. Pat. No. 4,091,083 and Greinke et al. U.S. Pat. No. 4,895,713 disclose chemical intercalation methods that involve soaking graphite particles in a solution comprising an aqueous acid and an aqueous oxidizing agent.

In Hirschvogel et al., graphite particles are soaked in sulfuric acid, to which hydrogen peroxide is added. The reaction mixture is agitated by, e.g., stirring, to maintain the graphite particles in a dispersed state. The graphite is thus converted to graphite hydrogensulfate. The excess acid is separated and the residual acid in the solid product is removed by washing. In Greinke et al., graphite flakes are mixed with an intercalation solution comprising sulfuric acid, phosphoric acid, etc. with an oxidizer such as nitric acid, perchloric acid, chromic acid, hydrogen peroxide, etc. Liquid-solid blending techniques completely disperse the liquid intercalation solution through the solid graphite flake, with the intercalation solution being introduced to the graphite while it is being stirred. Blending or mixing is continued to completely disperse the solution throughout the flakes.

U.S. Pat. No. 4,350,576 to Watanabe et al., which is incorporated by reference herein, describes an electrochemical intercalation process using an electrolytic intercalation solution preferably comprising sulfuric acid (50% aqueous solution or more) or nitric acid (30% aqueous solution or more) in which the graphite is subjected to electrolysis in which the current density is preferably 50 $mA/cm^2$ or less. The intercalated graphite is then dried and heated to 1,000° C. to obtain an expanded graphite.

Thus, while it has been known how to intercalate graphite, as more uses for the material have been discovered, it has become desirable to produce such a graphite intercalation compound in commercial quantities in a more efficient and economic manner. This means that sufficiently large quantities (i.e., >150 kg) can be intercalated in a reasonable period of time (i.e., <1 hr.), while providing an intercalated graphite that can be expanded to a high bulk density (i.e., >200 ml/g). Further, safety and environmental concerns relating to the use of potentially hazardous acids and oxidizers and energy consumption must be minimized.

Accordingly, it is the object of the present invention to provide a safe, efficient, economic, and environmentally acceptable method for producing graphite intercalation compounds that can be expanded to a high bulk density.

SUMMARY OF THE INVENTION

This object, as well as others that will become apparent upon reference to the following drawings and detailed description, is provided by a method of preparing graphite intercalation compounds in which graphite particles are immersed in an aqueous electrolyte media comprising both an acid and an oxidizing agent. The immersed graphite particles are subjected to an anodic current and then removed from the electrolyte and rinsed with a solvent. The excess solvent and electrolyte is then removed from the graphite particles. In a preferred method, the electrolyte comprises between approximately 99 Vol. % and 50 Vol. % of 66 Wt. % $H_2SO_4$ and between approximately 1 Vol. % and 50 Vol. % of 40 Wt. % $HNO_3$. The current density to which the immersed particles are subjected is between approximately 5 mA and 2A per gram of graphite, and the immersed graphite particles are subjected to this current for between approximately 1 and 180 minutes. Optionally, the oxidizing agent may be selected from the group consisting of $CrO_3$, $KMnO_4$, $(NH_4)_2SO_4$, $PbO_2$, $MnO_2$, $MnO$, $H_2O_2$, and $HClO_4$, instead of $HNO_3$. Further, the graphite particles may be placed in a plating barrel which is immersed in the electrolyte and rotated while the graphite particles are subjected to the current. The resultant intercalated graphite has an expansion volume of from between about 100 ml/g to 2000 ml/g when heated at 1000° C. for from 1 second to 10 minutes.

DETAILED DESCRIPTION

Figure 1:
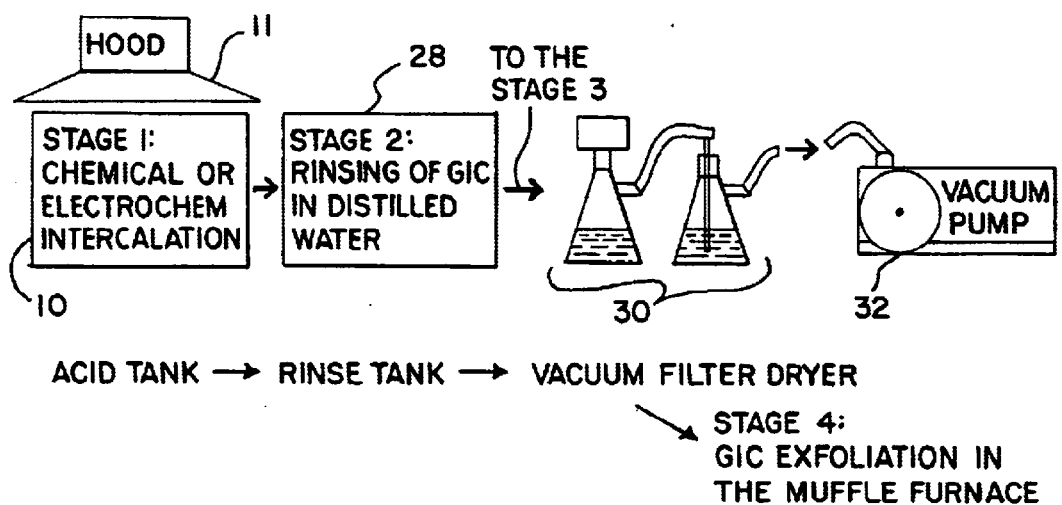
FIG. 1 is a schematic drawing illustrating the general process of preparing a graphite intercalation compound (GIC) and a thermally expanded graphite (TEG) in accordance with the examples set forth in the detailed description.

Several examples of a graphite intercalation process according to the present invention follow. FIG. 1 schematically illustrates the process used in the examples. With reference to FIG. 1, Stage 1 of the process is represented by an acid tank 10 having a hood 11 in which the synergistic chemical-electrochemical intercalation is performed. A rotatable plating barrel 12 (best seen in FIG. 2) along with cathodes 14 and electrolyte 16 are placed in the acid tank 10 so that the graphite particles held in the plating barrel are completely immersed in the aqueous electrolyte contained in the acid tank.

Figure 2:
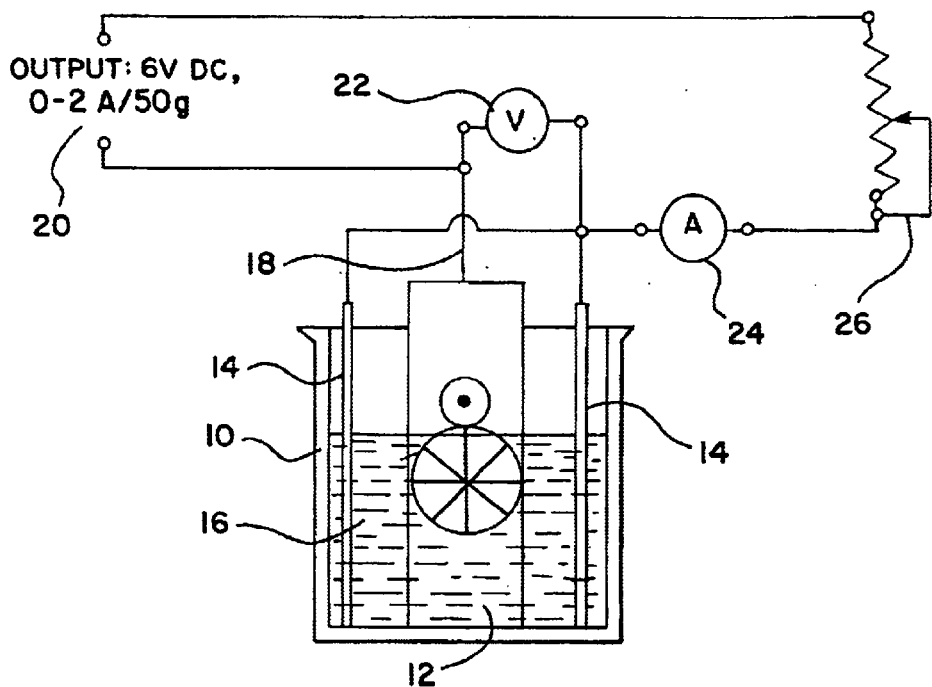
FIG. 2 is a schematic representation of a plating barrel, acid tank, and associated electrical circuitry for providing chemical electrochemical intercalation in accordance with one aspect of the present invention.

With reference to FIG. 2, the plating barrel 12 includes a anode 18 disposed on the interior thereof. The cathodes 14 and anode 18 (preferably copper or titanium) are electrically connected to a filtered DC (6V) power supply 20. A voltmeter 22 and ammeter 24 allow the user to monitor the voltage and current supplied to the system. The current input may be varied by means of a potentiometer 26, while the voltage input may be adjusted by a potentiometer located on the power supply.

Stage 2 of the process comprises rinsing the graphite intercalation compound by dipping the plating barrel containing the graphite in a rinse tank 28 which preferably contains distilled or deionized water. Rinsing helps to reduce hazardous fuming and corrosion of equipment in the subsequent drying and expansion steps. The GIC is then removed from the plating barrel and then dried in Stage 3 of the process so as to remove the excess electrolyte or rinse water. This is shown schematically by a vacuum filter drier 30 connected to a vacuum pump 32. Specifically, in the examples the GIC was discharged onto filter paper in a vacuum funnel with a 125 mm inside diameter. The vessel with funnel was then connected to a vacuum pump via a flask with a solution of caustic soda (50% industrial liquid). The pump was used to create a negative pressure in the vessels and drain moisture from the GIC. Traces of hazardous vapors were neutralized and dissolved by the caustic soda. Other methods for removal of the liquid may be used, such as using a filter press or roller press, pressing with an absorbent, heating, centrifuging, etc.

The dried GIC was then exfoliated in a muffle furnace and expanded at 1000° C. for a time of 10-15 sec. More specifically, 1 g of the dried GIC was spread onto a sheet of graphite foil (approximately 150 mm×300 mm, maximum thickness 0.014 in.) so that it was uniformly distributed over the foil. The foil and graphite were inserted as quickly as possible into the muffle furnace (measuring approximately 8 in. W×14 in. D×6.8 in. H), which was pre-heated to 1,000° C.±10° C. After 10 seconds, the foil and expanded GIC worms were removed from the oven and air cooled to room temperature. The worms were poured through a glass funnel into a glass graduated cylinder and the volume and mass, in grams, is measured.

In the examples, a purified flake graphite was used, specifically 2901 ThermoPURE thermally purified Kenmare Ancuabe flake graphite, available from the Superior Graphite Co. of Chicago, Ill. Other types of graphite particles may be used, including natural, synthetic, vein, and amorphous graphite, having a purity of between about 80% and 99.9% Loss on Ignition (LOI).

The current densities used in the examples were in the range of from 5 mA to 2A/50 g, (although current densities ranging between 0.1 mA/g and 5A/g are contemplated). The working electrolytes were the following acids (available from Fisher Scientific Co.) and their mixtures:H₂SO₄ (Gerber)—91 to 92.25 Wt. %, (Certified ACS Plus)—95.0 to 98.0 Wt. %, (Technical)—66 Wt. % HNO₃ (Certified ACS Plus)—68.0 to 70.0 Wt. %, (Technical)—40 Wt. %. The ratios of H₂SO₄:HNO₃ were 95:5, 90:10, 75:25, and 50:50. In the examples, the electrolyte comprised 66 Wt. % H₂SO₄ and 40 Wt. % HNO₃ in varying Vol. % ratios. A few examples were also performed in pure H₂SO₄ and HNO₃ without additives.

A plating barrel was also used during the synergistic chemical-electrochemical intercalation. The graphite particles are placed in the plating barrel and immersed in the electrolyte so that the electrolyte completely covers the plating barrel. For the examples, the plating barrel was manufactured by Singleton Corporation of Cleveland, Ohio. The wall of the plating barrel is made of stainless steel fine mesh, with square openings measuring 0.012 inches ×0.012 inches, which corresponds to 50 mesh U.S. standard testing sieve. The mesh allows electrolyte to come into the barrel but does not allow graphite particles to pass through it. A copper or titanium electrode "dangler" is disposed inside the barrel to serve as the anode. The acid tank includes two cathodes immersed therein, each of which could be either aluminum foil placed around the barrel on the walls of the tank or a graphite electrode.

In order to provide a basis for comparison of the GIC samples produced pursuant to the inventive method, Applicant has developed an "exfoliation efficiency coefficient," represented by θ, where:

$$\theta = V_{exf}/Wt_{exf}, \text{ in ml/g}$$

In this equation, $V_{exf}$ is the volume of exfoliated worms in milliliters and $Wt_{exf}$ is the weight of the material in grams left after exfoliation of a 1 g initial sample weight.

Pursuant to the experiments, it was determined that rinsing the intercalated graphite can have a significant influence on the quality of the final product. Because the intercalated particles absorb acid molecules, even small amounts of absorbed acids can generate hazardous fumes which are detrimental to both the workers and the equipment. It was found that rinsing the GIC for 1 minute significantly reduced the fumes generated while still providing for an exfoliation efficiency comparable to non-rinsed GIC. In contrast, a GIC rinsed for 15 minutes had only 56.4% of the exfoliation efficiency of a non-rinsed sample.

EXAMPLE 1

In a first series of tests, intercalation of graphite samples was performed in an electrolyte of H₂SO₄ (66 Wt. %):HNO₃ (40 Wt. %) of 95:5 (Vol. %). The samples of 50 g of material were subjected to anodic polarization of 1, 5, 30, and 60 minutes at current densities of 5 mA, 250 mA and 2A per batch.

Figure 3:
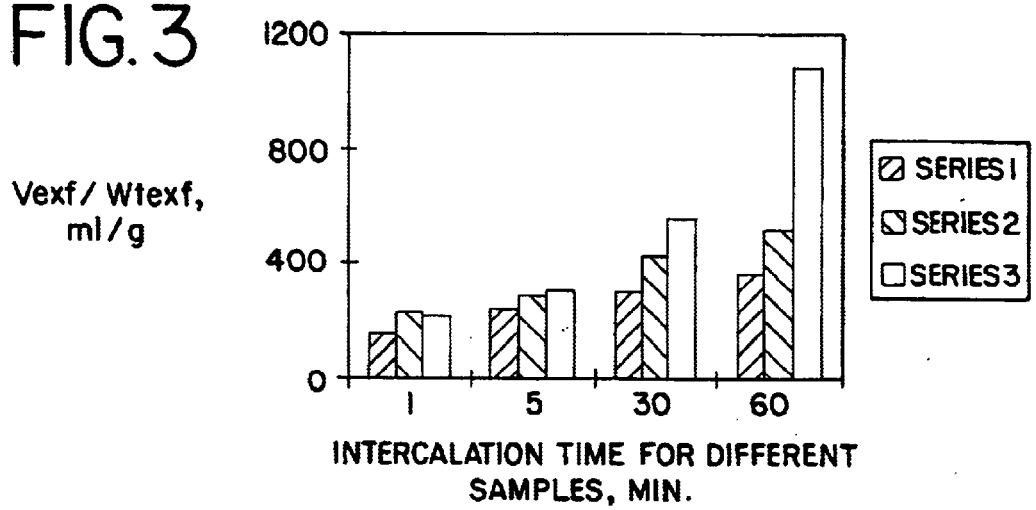
FIG. 3 is a bar chart showing the exfoliation efficiency coefficient, θ, in ml/g, versus intercalation time for current densities of 5 mA/50 g (Series 1), 250 mA/50 g (Series 2) and 2A/50 g (Series 3).

FIG. 3 is a bar graph showing exfoliation efficiency, θ, plotted against intercalation time for the three different current densities—5 mA/50 g (Series 1), 250 mA/50 g (Series 2) and 2A/50 g (Series 3). As can be seen, increases in intercalation time, even at relatively low current densities, produce exfoliation efficiency co-efficients of over 300 ml/g for intercalation times of over 30 minutes, and an acceptable exfoliation efficiency coefficient of approximately 200 ml/g is obtained even for a low current density of 250 mA/50 g at 5 minutes.

Variations in the value of θ become significant after 20-30 minutes of treatment time. Also, it appears that for a treatment time of less than 10-15 minutes, there is not a significant benefit to applying the higher current density to obtain an acceptable θ. Indeed, the use of the lower current density of 250 mA/50 g cuts down on the overall cost of the process, when compared to the use of 2A/50 g.

EXAMPLE 2

Figure 4:
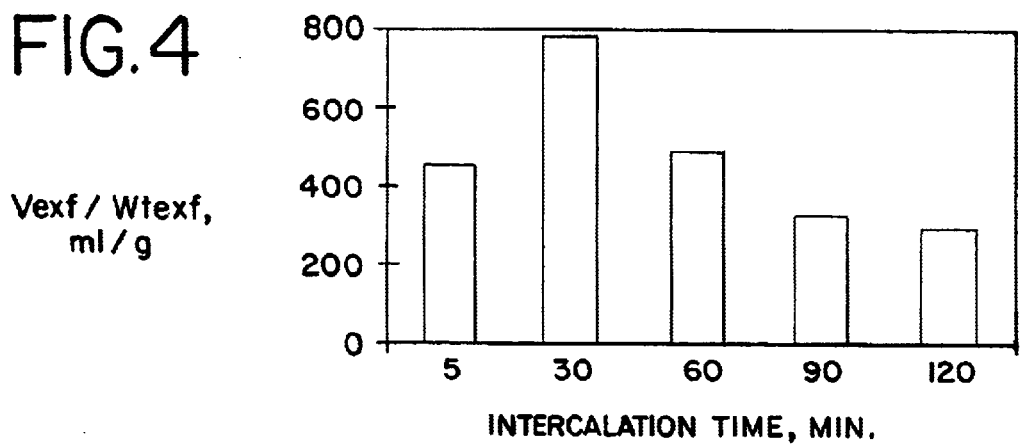
FIG. 4 is a bar chart showing the exfoliation efficiency coefficient, θ, in ml/g, versus intercalation time for an electrolyte of H₂SO₄ (66 Wt. %)—90 vol. % and HNO₃ (40 Wt. %)—10 Vol. %.

A second series of tests was conducted in which the ratio of $H_2SO_4$ (66 Wt. %):$HNO_3$ (40 Wt. %) was 90:10 (Vol. %). Low current densities of 5 mA/50 g were applied and the intercalation time varied between 5 and 120 minutes. As seen in FIG. 4, all samples tested demonstrated an exfoliation efficiency co-efficient θ of greater than 300 ml/g, and the sample intercalated for 30 minutes had a θ of almost 800 ml/g.

EXAMPLE 3

Figure 5:
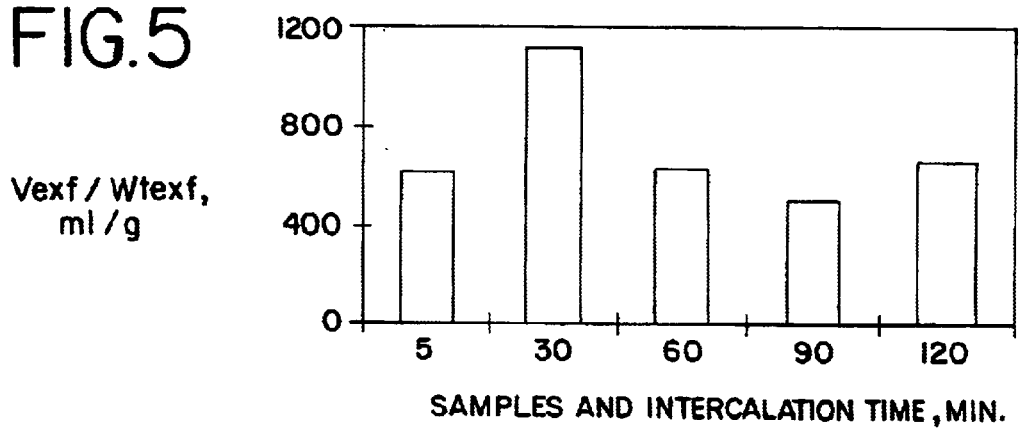
FIG. 5 is a bar chart showing the exfoliation efficiency coefficient, θ, in ml/g, versus intercalation time for an electrolyte of H₂SO₄ (66 Wt. % and HNO₃ (40 Wt. %)—25 Vol. %.

In a third series of tests, the volume percent ratio of $H_2SO_4$ (66 Wt. %):$HNO_3$ (40 Wt. %) was 75:25 (Vol. %). A polarizing current density of 5 mA/50 g was applied for intercalation times of varying between 5 and 120 minutes. As can be seen with reference to FIG. 5, extremely high values for θ were obtained particularly for the sample prepared for 30 minutes which had θ approaching 1200 ml/g.

EXAMPLE 4

Figure 6:
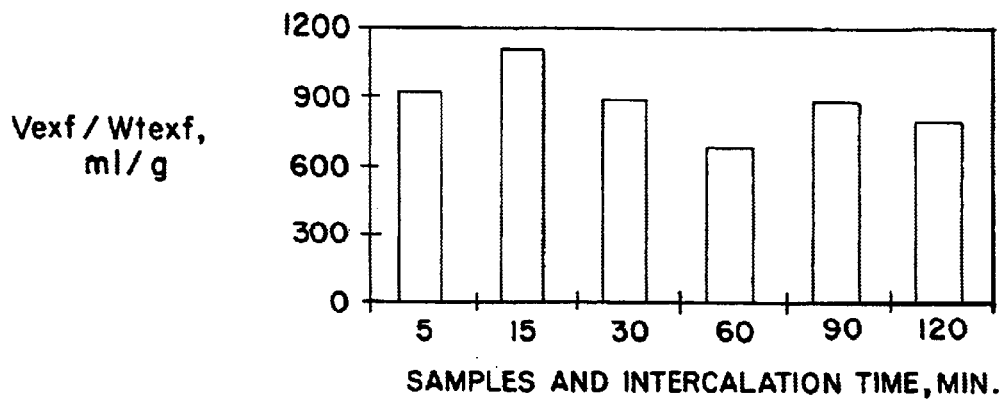
FIG. 6 is a bar chart showing the exfoliation efficiency coefficient, θ, in m/g, versus intercalation time for an electrolyte of H₂SO₄ (66 Wt. %)—50 Vol. % and HNO₃ (40 Wt. %)—50 Vol. %.

In a fourth series of tests of tests, the volume percent ratio of $H_2SO_4$ (66 Wt. %):$HNO_3$ (40 Wt. %) was 50:50 (Vol. %). Again, the intercalation time was varied between 5 and 120 minutes and the resulting value for θ for the various intercalation times is seen in FIG. 6. While high exfoliation efficiency co-efficients are obtained, the electrolyte in this series of tests is highly corrosive, and comparable results can be obtained using a much less corrosive electrolyte composition of 75:25 (Vol. %) reported in Example 3.

EXAMPLE 5

Figure 7:
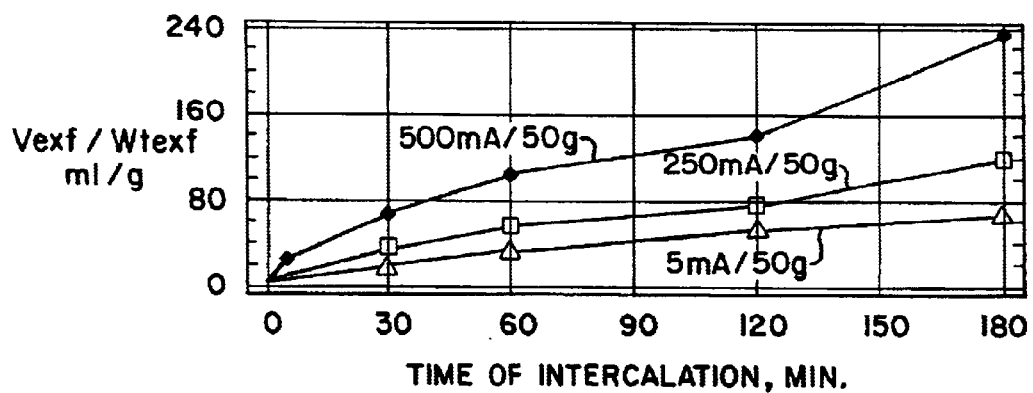
FIG. 7 is a graph plotting the exfoliation efficiency, θ, in ml/g, versus time for current densities of 5 mA/, 250 mA/ and 50 mA/50 g for 100 Vol. % H₂SO₄ (66 Wt. %).
Figure 8:
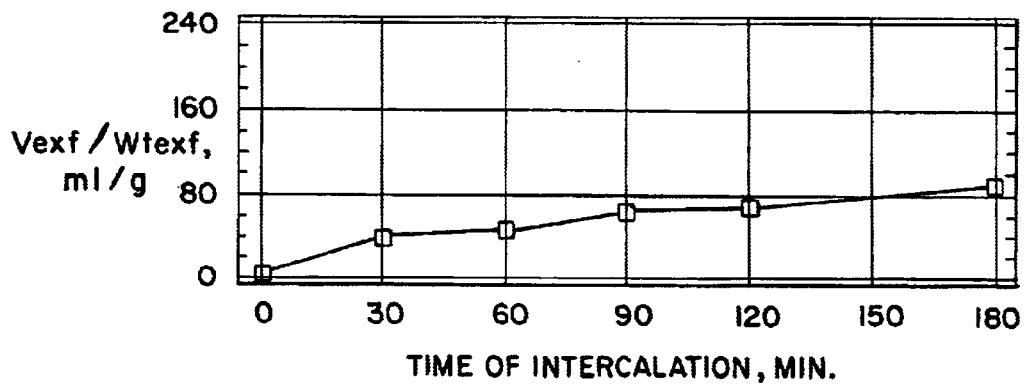
FIG. 8 is a graph plotting exfoliation efficiency, θ, in ml/g, versus time for a current density of 0.5A/50 g (or 10 mA/g) for 100 Vol. % HNO₃ 40 Wt. %).

A final series of test was performed in which the volume percent ratio of $H_2SO_4$:$HNO_3$ was 100:0 (FIG. 7) (at current densities between 5 mA/50 g and 500 mA/50 g) and 0:100 (FIG. 8) (at a current density of 0.5 A/50 g). As can be seen from FIG. 7, exfoliation efficiencies of approximately 220 ml/g are obtained at 10 mA/g after 3 hours of intercalation in pure sulfuric acid. Even though the pure sulfuric acid has a lower environmental impact, the increased production time is a drawback. The previously reported examples show that even a small percentage of $HNO_3$ can produce good exfoliation efficiency for short intercalation times.

Based upon the examples reported above, a pilot plant run was conducted in which a 50 lb. batch of 2901 ThermoPURE® thermally purified Kenmare Ancuabe natural crystalline flake graphite (available from the Superior Graphite Co.) was intercalated in an electrolyte of $H_2SO_4$ (66 Wt. %):$HNO_3$ (40 Wt. %) of 90:10 (Vol. %) for 10 minutes at a current density of as low as 1 mA/g. The intercalated graphite was rinsed for 1 minute in water and then the batch was split into two parts. The first part was dried by centrifuging for 45 minutes. The second part was air dried overnight. Both the centrifuged and air-dried GIC's were expanded and had θ's of approximately 700 to 800 ml/g.

While the invention has been described in terms of a preferred embodiment, there is no intent to limit the invention to the same. Indeed, the current densities and intercalation times can be varied to optimize the exfoliation efficiency of the resultant GIC. Indeed, intercalation times up to and exceeding 180 minutes are contemplated.

What is claimed:

1. A method of preparing a graphite intercalation compound comprising:

providing graphite particles;

providing a plating barrel;

placing the graphite particles in the plating barrel;

immersing the plating barrel and the graphite particles contained therein in an aqueous electrolyte media comprising an acid and an oxidizing agent;

subjecting the immersed graphite particles to an anodic current;

rotating the plating barrel;

removing the graphite particles from the electrolyte and rinsing the graphite particles with a solvent; and removing the excess electrolyte and solvent from the graphite particles.

2. The method of claim 1 wherein the electrolyte comprises $H_2SO_4$ for the acid and $HNO_3$ for the oxidizing agent.

3. The method of claim 2 wherein the electrolyte comprises between approximately 99 Vol. % and 50 Vol. % of 66 Wt. % $H_2SO_4$ and between approximately 1 Vol. % and 50 Vol. % of Wt. % $HNO_3$.

4. The method of claim 1 or claim 3 wherein the density of the current to which the immersed graphite particles are subjected is between approximately 0.1 mA and 5 A per gram of graphite.

5. The method of claim 4 wherein the immersed graphite particles are subjected to the anodic current for between approximately 1 minute and 180 minutes.

6. The method of claim 3 or 5 wherein the solvent is distilled water.

7. The method of claim 3 or 5 wherein the solvent is deionized water.

8. The method of claim 1 wherein the acid is $H_2SO_4$ and the oxidizing agent is selected from the group consisting of $HNO_3$, $CrO_3$, $KmnO_4$, $(NH_4)_2SO_4$, $PbO_2$, $MnO_2$, $MnO$, $H_2O_2$ and $HClO_4$.

9. A method of preparing a graphite intercalation compound comprising:

providing graphite particles;

providing a plating barrel;

placing the graphite particles in the plating barrel;

immersing the plating barrel and the graphite particles contained therein in an aqueous electrolyte media of between about 90 vol. % and 75 Vol. % of 66 Wt. % $H_2SO_4$ and between about 10 Vol. % and 25 Vol. % of 40 Wt. % $HNO_3$;

subjecting the immersed graphite particles to a current of approximately 1 mA per gram of graphite for between approximately 1 to 60 minutes;

rotating the plating barrel;

rinsing the graphite particles in water for approximately 1 minute; and drying the graphite particles.

10. The method of claim 9 wherein the water is distilled.

11. The method of claim 9 wherein the water is deionized.

12. The method of claim 9 wherein the graphite particles are dried in a vacuum drier.

13. The method of claim 9 wherein the graphite particles are dried in a filter press.

14. The method of claim 9 wherein the graphite particles are dried in a centrifuge.

15. The method of claim 1 or 9 wherein the plating barrel is a wall plating barrel with a ±50 mesh opening wall.

16. The method of claim 1 or 9 wherein the graphite particles are selected from the group consisting of natural, synthetic, vein, and amorphous graphite, all having a purity of between about 80% and 99.9% LOI.

* * * * *